(12) United States Patent
Laybourn et al.

(10) Patent No.: US 7,406,305 B2
(45) Date of Patent: Jul. 29, 2008

(54) SYSTEM FOR MANAGING PREPAID WIRELESS SERVICE

(75) Inventors: Bernard T Laybourn, Cheshire (GB); Theodore W Walter, Long Beach, CA (US)

(73) Assignee: Telemac Corporation, Culver City, CA (US)

( * ) Notice: Subject to any disclaimer, the term of this patent is extended or adjusted under 35 U.S.C. 154(b) by 239 days.

(21) Appl. No.: 10/616,176

(22) Filed: Jul. 8, 2003

(65) Prior Publication Data

US 2004/0009760 A1  Jan. 15, 2004

Related U.S. Application Data

(62) Division of application No. 09/354,904, filed on Jul. 16, 1999, now Pat. No. 6,480,710.

(60) Provisional application No. 60/093,000, filed on Jul. 16, 1998.

(51) Int. Cl.
*H04M 11/00* (2006.01)
(52) U.S. Cl. .................. 455/405; 455/407; 455/435.1; 370/352
(58) Field of Classification Search ............... 455/406, 455/407, 405, 435.1; 370/352
See application file for complete search history.

(56) References Cited

U.S. PATENT DOCUMENTS

| | | | |
|---|---|---|---|
| 3,459,882 A | 8/1969 | Gabriel et al. | |
| 3,531,586 A | 9/1970 | Bass et al. | |
| 3,725,947 A | 4/1973 | Albertini et al. | |
| 3,938,091 A | 2/1976 | Atalla et al. | |
| 4,518,824 A | 5/1985 | Mondardini | |
| 4,585,904 A | 4/1986 | Mincone et al. | |
| 4,635,285 A | 1/1987 | Coombes | |
| 4,706,275 A | 11/1987 | Kamil | |
| 4,831,647 A | 5/1989 | D'Avello et al. | |
| 4,839,829 A | 6/1989 | Freedman | |
| 4,860,341 A | 8/1989 | D'Avello et al. | |
| 4,916,621 A | 4/1990 | Bean et al. | |
| 4,941,172 A * | 7/1990 | Winebaum et al. | ..... 379/357.03 |
| 4,951,308 A | 8/1990 | Bishop et al. | |
| 4,958,368 A | 9/1990 | Parker | |

(Continued)

FOREIGN PATENT DOCUMENTS

EP  0827119 A  3/1998

(Continued)

OTHER PUBLICATIONS

Wilken, Claudia, United States District Judge "Order Contruing Claims", Sep. 6, 2000.

(Continued)

*Primary Examiner*—William D Cumming
(74) *Attorney, Agent, or Firm*—Townsend and Townsend and Crew LLP; Guy W. Chambers

(57) ABSTRACT

A method facilitates provisioning of pre paid wireless services. Credit refresh operations involving a pre paid wireless communication device involve SMS messages transmitted to the device over the air. The device uses tariff tables to keep track of a call's impact on available credit. The tariff tables are updatable at the service provider's discretion using SMS messages.

15 Claims, 9 Drawing Sheets

U.S. PATENT DOCUMENTS

| | | | |
|---|---|---|---|
| 4,964,156 A * | 10/1990 | Blair | 379/189 |
| 4,965,821 A | 10/1990 | Bishop et al. | |
| 5,020,091 A | 5/1991 | Krolopp et al. | |
| 5,023,936 A | 6/1991 | Szczutkowski et al. | |
| 5,046,188 A | 9/1991 | Molnar | |
| 5,109,401 A | 4/1992 | Hattori et al. | |
| 5,127,041 A | 6/1992 | O'Sullivan | |
| 5,134,651 A | 7/1992 | Ortiz et al. | |
| 5,138,650 A | 8/1992 | Stahl et al. | |
| 5,144,649 A | 9/1992 | Zicker et al. | |
| 5,148,472 A | 9/1992 | Freese et al. | |
| 5,148,474 A | 9/1992 | Haralambopoulos et al. | |
| 5,203,014 A | 4/1993 | Wagai et al. | |
| 5,220,593 A | 6/1993 | Zicker et al. | |
| 5,233,642 A | 8/1993 | Renton | |
| 5,233,656 A | 8/1993 | Langrand et al. | |
| 5,276,729 A | 1/1994 | Higuchi et al. | |
| 5,297,191 A | 3/1994 | Gerszberg | |
| 5,297,192 A | 3/1994 | Gerzberg | |
| 5,301,223 A | 4/1994 | Amadon et al. | |
| 5,303,285 A | 4/1994 | Kerihuel et al. | |
| 5,303,297 A | 4/1994 | Hillis | |
| 5,309,500 A | 5/1994 | Koma et al. | |
| 5,325,418 A | 6/1994 | McGregor et al. | |
| 5,335,278 A | 8/1994 | Matchett et al. | |
| 5,359,182 A | 10/1994 | Schilling | |
| 5,361,297 A | 11/1994 | Ortiz et al. | |
| 5,384,776 A | 1/1995 | Gulliford et al. | |
| 5,386,455 A | 1/1995 | Cooper | |
| 5,446,759 A | 8/1995 | Compana, Jr. | |
| 5,577,100 A | 11/1996 | McGregor et al. | |
| 5,610,972 A * | 3/1997 | Emery et al. | 455/445 |
| 5,625,669 A | 4/1997 | McGregor et al. | |
| 5,631,947 A | 5/1997 | Wittstein et al. | |
| 5,722,067 A | 2/1998 | Fougnies et al. | |
| 5,740,247 A | 4/1998 | Violante et al. | |
| 5,748,720 A | 5/1998 | Loder | |
| 5,749,052 A | 5/1998 | Hidem et al. | |
| 5,761,624 A | 6/1998 | Mooney et al. | |
| 5,826,185 A * | 10/1998 | Wise et al. | 455/405 |
| 5,915,226 A | 6/1999 | Martineau | |
| 5,983,091 A * | 11/1999 | Rodriguez | 455/405 |
| 6,295,291 B1 * | 9/2001 | Larkins | 370/352 |
| 6,577,857 B1 * | 6/2003 | Rodriguez | 455/405 |
| 6,850,252 B1 * | 2/2005 | Hoffberg | 715/716 |
| 2002/0098826 A1 * | 7/2002 | Wakil et al. | 455/406 |
| 2003/0008634 A1 * | 1/2003 | Laybourn et al. | 455/407 |
| 2003/0195000 A1 * | 10/2003 | Rodriguez | 455/435.1 |
| 2004/0009760 A1 * | 1/2004 | Laybourn et al. | 455/405 |

FOREIGN PATENT DOCUMENTS

| | | |
|---|---|---|
| EP | 0827119 A1 | 3/1998 |
| GB | 2265522 | 9/1993 |
| JP | 3-45031 | 7/1989 |
| JP | 3280652 | 3/1990 |
| JP | 345031 | 2/1991 |
| JP | 3-60229 | 3/1991 |
| JP | 3080756 | 4/1991 |
| WO | WO 9216078 | 9/1992 |
| WO | WO 94/28670 | 12/1994 |
| WO | WO 95 28062 A | 10/1995 |
| WO | WO 9528062 | 10/1995 |
| WO | WO 96 24229 A | 8/1996 |
| WO | WO 9624229 | 8/1996 |
| WO | WO 9743851 | 11/1997 |

OTHER PUBLICATIONS

Lee, William, Mobile Cellular Telecommunications Systems, 1989 pp. 68-70.

Sim's Communications Inc. Instafone, 1993.

Nokia Phones, Inc., Nokia Service Manaual 101/1000, 1991 and 1992.

Omex Communications advertisement (1993), Pricing List (1993 and 1994).

W S: "Schweizer Telecom PTT Lanciert Die Welt-Neuheit Nsatel Sicap" NTZ Nachrichtentechnische Zeitscrift, vol. 48, No. 10 Oct. 1995 pp. 44, 46.

Machado, L., "Making Cellular Renting Your Business" All in Communications, Oct. 1993, pp. 24-27.

* cited by examiner

SYSTEM FOR MANAGING PREPAID WIRELESS SERVICE

CROSS-REFERENCES TO RELATED APPLICATIONS

This application is a divisional application of U.S. patent application Ser. No. 09/354,904, filed Jul. 16, 1999 now U.S. Pat. No. 6,480,710, entitled "System and Method for Managing Prepaid Wireless System;" which claims priority from U.S. Provisional Application No. 60/093,000, filed Jul. 16, 1998, entitled "System and Method for Managing Prepaid Wireless System," the disclosures of which are hereby incorporated by reference.

FIELD OF INVENTION

The present invention relates to system and method for managing a prepaid wireless service.

BACKGROUND OF THE INVENTION

In a conventional wireless system, a subscriber purchases a wireless phone (i.e., a handset) and a wireless service from a service provider. The subscriber has a contract with the service provider and pays a monthly subscriber fee for access to the wireless service and also pays for air time. If the subscriber fails to timely pay, the service provider may disconnect the service. Then the service provider have to attempt to collect money for unpaid bills. U.S. Pat. No. 5,740,247 describes a cellular telephone communication refill system. This system includes an apparatus that meters payment according to a predetermined parameter (e.g., a number of calls, an amount of funds, etc.). The predetermined parameter is stored within a secured metering device of the apparatus.

U.S. Pat. No. 5,577,100 describes a mobile phone having internal accounting capabilities for real time call debiting. The mobility phone includes an internal memory which stores an upgradeable rate table and a complex billing algorithm calculating an account status on the fly. In addition, the mobile phone is capable of alerting a customer of real time account status. Furthermore, this U.S. patent provides for a communication system which activates the mobile phone and upgrades the account status in the rate table over airways.

Therefore, there is a need for a wireless prepaid system where the service provider does not need to be concerned with collecting the unpaid bills and where the subscriber has control over his wireless expenditures.

BRIEF SUMMARY OF THE INVENTION

The present invention provides a technique for facilitating provisioning of pre paid wireless communication services. In accordance with an embodiment of the present invention a wireless device includes a memory that stores a credit amount and a tariff or rate table. The credit amount can be set at the time the device is activated. The device monitors the credit available and recalculates that amount as the device is used. The recalculation uses information stored in the tariff or rate table. In the event the subscriber needs to refresh the available credit he or she contacts the service provider and provides either credit or debit account information and/or prepaid calling card information to an IVR system or to an agent in a call center environment. The provider then generates an SMS message to modify the credit contents of the device's memory over the air. Furthermore, the provider may provide a plurality of alternative tariff or rate tables, and/or may modify such tables over time. The provider can use SMS messages to update the device's memory to include an alternative tariff or rate table.

DETAILED DESCRIPTION OF THE INVENTION

General Overview of System 1

In a system in accordance with the present invention for managing a wireless prepaid service, a network provider delivers a wireless communications network, e.g., Global System for Mobile Communications (GSM) network. The present invention is just as applicable to alternative wireless communication networks as it is to GSM. A service provider, on the other hand, provides a prepaid service which includes delivering customer service functions to a subscriber of such services.

Figure 1:
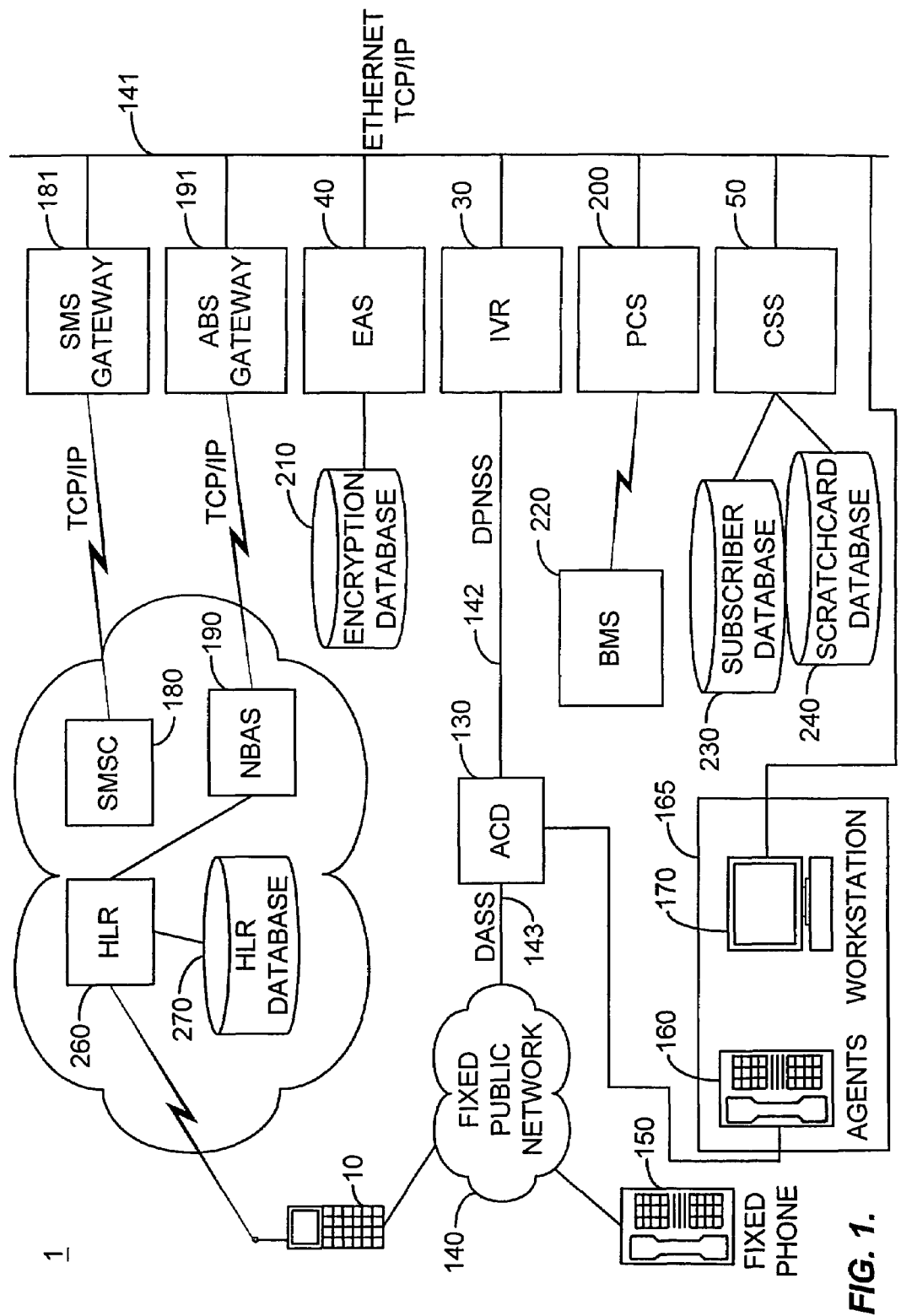
FIG. 1 shows an exemplary embodiment of a system according to the present invention.

FIG. 1 shows an exemplary embodiment of the system 1 in accordance with the present invention. The system 1 includes a combination of networked workstations and servers that are described below. Connections within the system 1, except as otherwise indicated, are made via, e.g., Ethernet Transmission Control Protocol/Internet Protocol (TCP/IP) 141. Alternative data networking arrangements may be provided to transfer data throughout the system.

The system 1 is accessible via a wireless device 10 (e.g., a mobile phone), a fixed phone 150 or a communication network (e.g., the Internet) (not shown). Using the device 10, the subscriber is connected to a Fixed Public Phone Network (FPPN)140, via a wireless network; the phone 150 is connected to the FPPN 140 directly. The FPPN 140 then connects the subscriber, via a suitable telephony interface, e.g., Digital Access Signaling System (DASS) 143, to an Automatic Call Distribution (ACD) system 130.

The ACD 130 may connect the subscriber to an automated Interactive Voice Response (IVR) system 30 via a suitable telephony interface, e.g., Digital Private Network Signaling System (DPNSS) 142 or to a Call Center 165 having customer service agents. The subscriber may switch between the IVR 30 and the Call Center 165 at any time during the call.

Device 10

Figure 2:
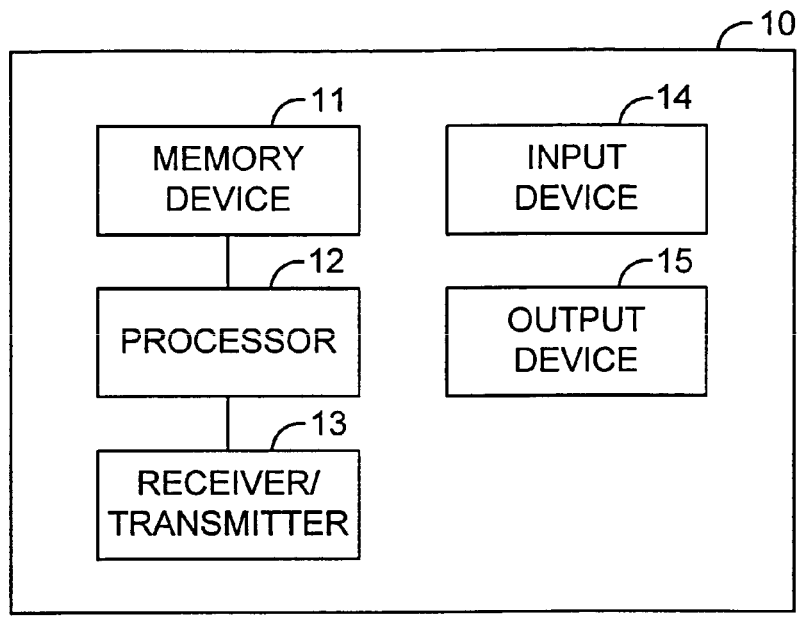
FIG. 2 shows an exemplary embodiment of a wireless prepaid device according to the present invention.

FIG. 2 illustrates in more detail the wireless device 10 of the system 1. The device 10 can be, e.g., a wireless phone, a wireless pager, or an apparatus having a wireless modem. The device 10 includes a memory device 11, a processor 12, a receiver/transmitter 13, an input device 14 and an output device 15. The input device 14 can be, e.g., a keyboard, a voice recognition device, etc. The output device 15 can be, e.g., a LCD screen, a display, a monitor, a sound device, etc. The memory device 11 may store, e.g., software applications, a subscriber profile, calling tariff tables, an unique identification number (in this embodiment of the invention the MSISDN of the wireless phone subscriber) and an available credit amount. The memory device 11 also stores a preprogrammed number which allows the subscriber to connect with the system 1 to be activated and/or to replenish the credit amount.

Calls to and from the device 10 invoke call charging based on the calling tariff tables stored in the memory device 11. For each call received or initiated, the device 10 calculates its cost using the tariff or rate tables stored in the memory, and deducts the cost from the available credit amount.

Certain data (e.g., the preprogrammed number and MSISDN) of the memory device 11 are stored during an assembly process of the device 10 by a manufacturer. The manufacturer provides this data, e.g., as a data file, to the service provider. The service provider needs the data file to perform an initial provisioning of the device 10 on the wireless network. The file is initially stored in a Customer Support System (CSS) 50 (described in detail below). At a predetermined time, the data file is transferred to a Network Billing and Administration System (NBAS) 190 and an encryption and authorization server 40 (hereinafter EAS) such as the Debit Authorization Server (DAS) from Telemac Cellular Corporation. These data file transfers and processing are performed before any use can be made of the device 10.

The device 10 is capable of receiving and sending information using Short Message Service (SMS) messages. Security of the SMS messages is provided by an encryption server, e.g., EAS 40. The EAS 40 ensures that the SMS messages cannot be reused, copied, viewed or altered. The EAS 40 encrypts the information in the SMS messages (e.g., the MSISDN, credit refresh, SIM Serial Number (SSN) and a message serial number for this encryption of the SMS message). The EAS 40 passes the SMS message to the IVR 30 which then sends the SMS message to the device 10 (See FIG. 1).

Figure 3:
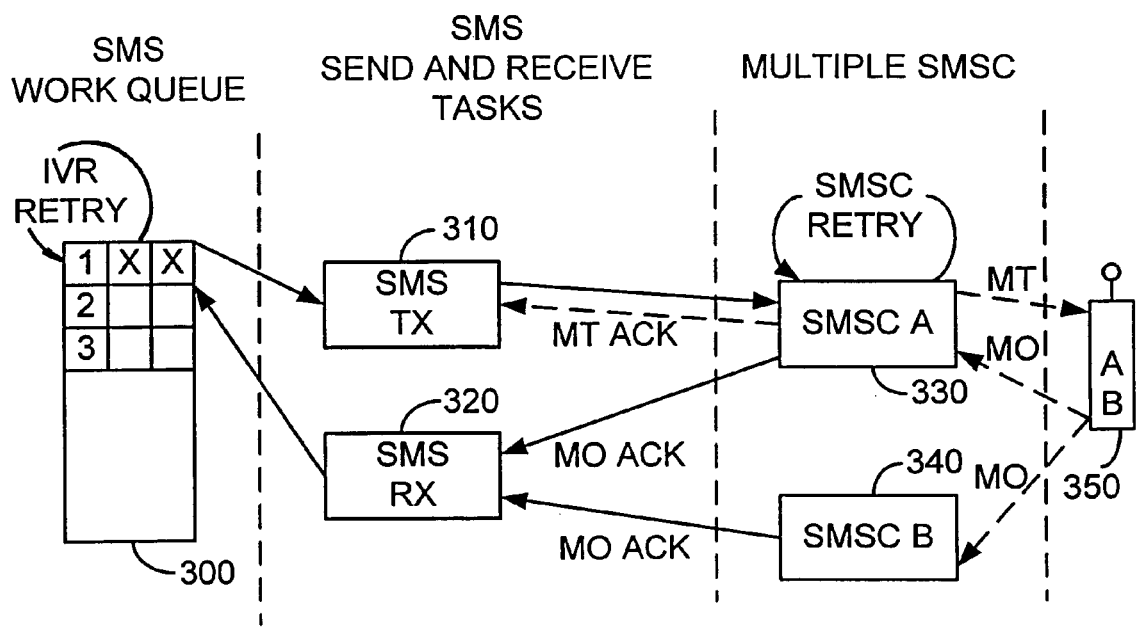
FIG. 3 shows a diagram illustrating a short message service process.

FIG. 3 illustrates a diagram of a Short Message Service Process. The system 1 implements an SMS Center (SMSC) 180 (in FIG. 1) that supports an appropriate two way protocol over, e.g., the TCP/IP transport connection. A Short Message Service Mobil Terminated (SMS MT) message containing predetermined information is sent over the air to the device 10. The device 10 receives the SMS messages using the receiver/transmitter 13 (FIG. 2), decrypts the SMS MT message and performs the required operation (e.g., a credit refresh). Then, the device 10 sends a positive acknowledgment in the form of a Short Message Service Mobile Originated (SMS MO) message back using the receiver/transmitter 13. The SMS MO messages from the device 10 to the system 1 are not charged to the subscriber.

The IVR 30 manages an SMS work queue 300, including an application level flow control, retry counts, monitoring and auditing. The IVR SMS Send Task (SMS TX) 310 monitors the SMS work queue 300, processes new entries accordingly, monitors MT ACK messages returned from the SMSC 180 (which can be SMSC A 330 and SMSC B 340) and updates the status in the SMS work queue 300.

The IVR SMS Receive Task (SMS RX) 320 monitors the MO ACK from the devices 10, by whatever route they arrive (i.e., the SMSC A 330 or the SMSC B 340), links them with the appropriate SMS MT message, and then updates the SMS work queue 300 as well as stores any data returned with the SMS MO message.

CSS 50

The CSS 50, shown in FIG. 1, includes a subscriber database 230 and a scratch card (i.e., a prepaid calling card) database 240. The subscriber database 230 continuously keeps track of all activities conducted by the subscriber, the IVR 30 and/or the Call Center 165 (e.g., activation, credit refresh, and device 10 activities). In addition, the subscriber database 230 automatically mirrors the information stored in the memory device 11 of the device 10. The subscriber database 230 is used to resolve disputes with the subscriber and to detect possible fraud.

The scratch card database 240, on the other hand, tracks all activities of a scratch card (e.g., generation, printing, distribution, activation and use of the scratch card). In one embodiment, the subscriber and scratch card databases 230, 240 are run and maintained using, Microsoft SQL Server® from Microsoft Corporation. Further, in one embodiment, a CSS application software on CSS 50 runs under, Microsoft Windows NT® Version 4 from Microsoft Corporation.

SOFTWARE MODEL

Figure 4:
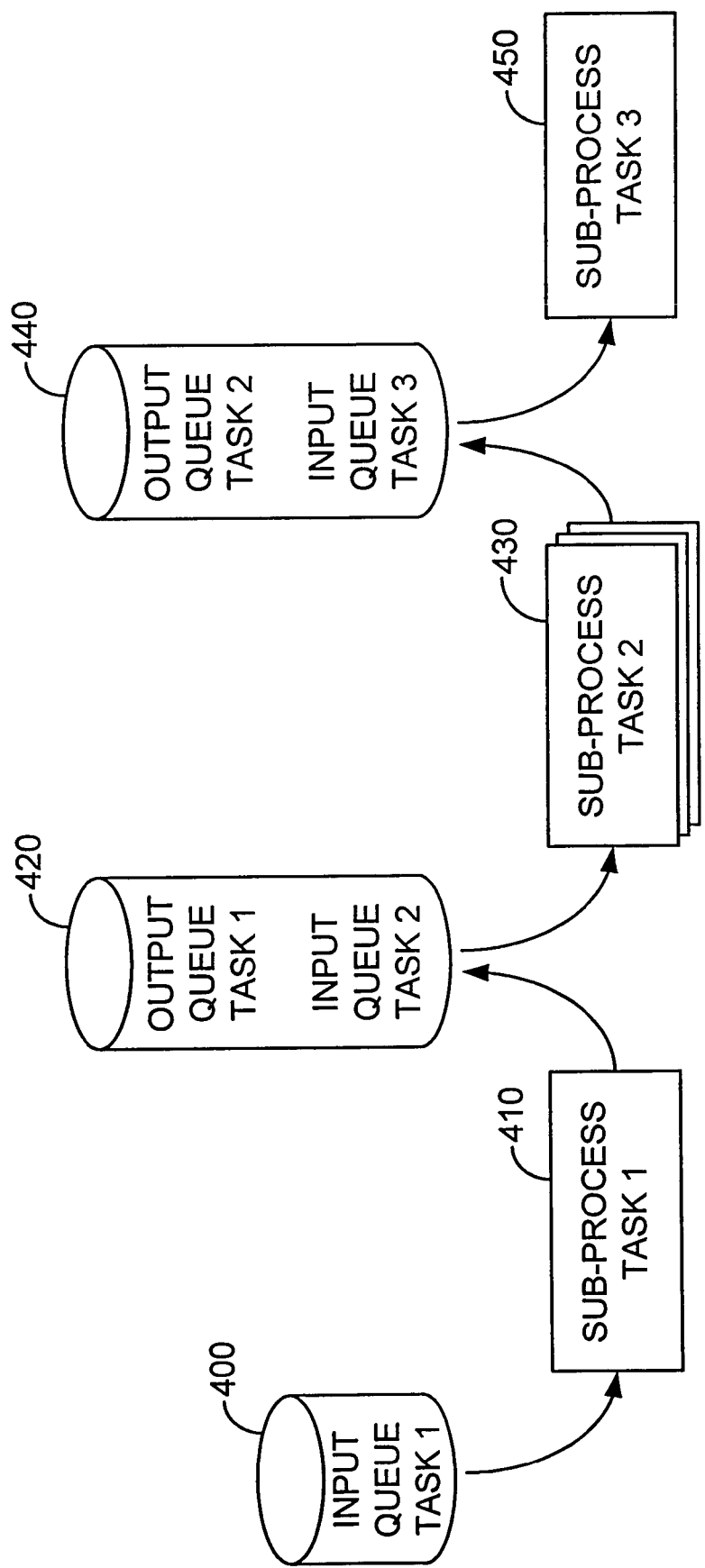
FIG. 4 shows an exemplary embodiment of a software model of processing queues.

The system 1 according to one embodiment the present invention utilizes a software model of 'work queues'. An exemplary embodiment of the software model is shown in FIG. 4. A process includes a number of separate and discrete subprocesses; each subprocess can be managed by a single task. For example, an input queue 400 provides information about a task 1 which is necessary to perform the subprocess 410. The subprocess 410 processes the information in accordance with a definition of the process and then places results in an output queue 420. The output queue 420 for the subprocess 410 then becomes an input queue 420 for a subprocess 430, within the definition of the process. The input queue 420 provides information about a task 2 to the subprocess 430 and then the results are placed in an output queue 440. The queue 440 serves as the output queue for the subprocess 430 and also as an input queue for a subprocess 450. If for some reason any task stops, the input queue processes grow, and the output queue gradually diminishes to an empty queue, as the other subprocesses ahead in a production line continue to work. If the input queue grows at a rate greater than the rate a task can process it, additional occurrences of the same task can be started.

In one embodiment, the software model, shown in FIG. 4, is applied to the credit refresh process described below, where separate processes exist for credit/debit card validation, the EAS processing, and the SMS messages sending. This software model is suited to applications where a number of specialized processes are required. The software model also facilitates easy adaptation into other environments where interfaces change. There is no need to change an entire application, only the subapplication that performs that process. This approach also speeds up integration testing, as each subapplication can be completely tested in isolation to the other sub applications. Additionally, the processes that put work into the queues are not only the IVR 30 processes; they are also personal computer based applications deployed in the Call Center 165.

Activation

Figure 5:
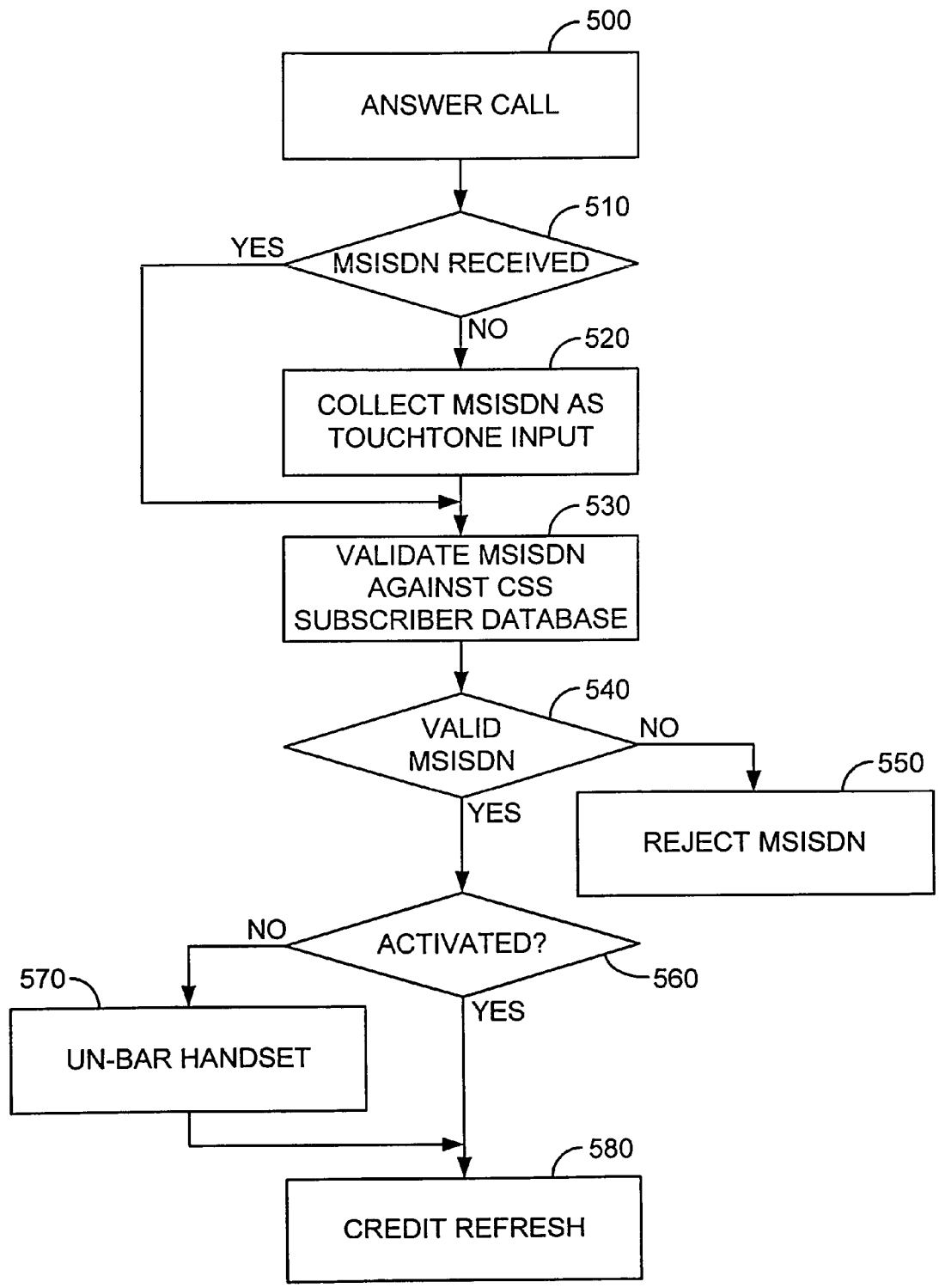
FIG. 5 shows a flow chart illustrating carrying out an activation process.

FIG. 5 provides a flow chart illustrating a process for activating wireless device 10. When the subscriber dials the preprogrammed number, the call is routed to and answered by IVR 30(step 500). Alternatively, the subscriber may activate the device 10 by calling the Call Center 165 (described in detail below). To activate the device 10, the IVR 30 uses device 10's MSISDN.

The IVR 30 responds differently to calls received from the device 10 for the first time, a registered device 10, a non registered device 10, the fixed phone 150 or the communication network.

When the call is received by the IVR 30, the IVR 30, using its Digital Signal Processing (DSP) input recognition capability, analyzes an A party number (i.e., a number of calling party or a call originator) to determine automatically the MSISDN as the DSP input (step 510). If the subscriber uses any means other than the device 10 to connect to the system 1, the IVR 30, prompts the subscriber to enter manually the appropriate MSISDN as a DTMF input (step 520).

Subsequently, the system 1 determines whether the MSISDN is valid using the subscriber database 230 (step 530). If the MSISDN is invalid, the system 1 rejects the call or requests the subscriber to reenter the MSISDN (step 550). If the MSISDN is valid (step 540) (i.e., had been already provisioned to be used within the system 1), the system 1 then checks if the mobile device has already been activated referring to its MSISDN (step 560). As described above, the device 10 cannot be activated without prior provisioning. If the MSISDN was not activated before (i.e., its a non registered device 10), the system 1 activates it by unbarring (step 570) and then sends the subscriber to the credit refresh process (step 580). The subscriber is also sent to the credit refresh if the IVR 30 determines that the MSISDN was activated previously. Subsequently, the IVR 30 updates the subscriber database 230.

The "activated?" step can include a substep of checking whether a bar was placed on the device 10 (not shown). If the device 10 is barred, then a further check is made to establish whether the bar is in place as a result of the agents' request (e.g., because the associated device 10 was stolen). If this is not the case, then the IVR 30 records that the device 10 is not active by setting an internal flag, but it can be activated and unbarred as described. If however, it was barred at an agent's request further processing may be inhibited.

Once activation of the device 10 and the credit refresh (described below) have been successfully processed, the IVR 30 instructs the CSS 50 to unbar the associated MSISDN. The CSS 50 then interfaces with the Gateway 191 to remove the incoming call bar and thus enable incoming SMS messages and telephone calls to the device 10. Due to the NBAS 190 unavailability for a routine maintenance, activation of the device 10 might be limited to be performed only between certain hours of the day. This is because the responses from the NBAS 190 that the system 1 needs to complete the unbar process may not be delivered until several hours have elapsed from submission of the unbar requests. The IVR 30 may advise the subscriber as to this availability, and prevent the activation with an appropriate message. In such cases the CSS 50 queues requests and only sends them to the NBAS 190 when it is on line. After sending a provisioning request to the NBAS 190, the CSS 50 polls for an acknowledgment that the request has been acted on. The CSS 50 maintains flags in the subscriber database 230 that indicate the current status of the subscriber (via the MSISDN).

Within the activation component, the CSS 50 un bars the device 10 via the NBAS 190 interface to a Home Location Register (HLR) 260 within the system 1 (shown in FIG. 1). The HLR 260 has a HLR database 270.

At the time of activation, the service provider can use the SMS service described below to provide tariff table information to the device over the air. Updates of this tariff table can be sent whenever a subscriber seeks to refresh the credit of the wireless device as described below. Alternatively, the service provider can initiate an SMS message that forwards tariff table updates at any time the service provider needs to do so. This enables the service provider to have maximum flexibility in establishing its tariff rates, especially as network providers become more competitive in price structures offering alternative rate packages to capture as many different users, having different usage patterns, as possible.

Credit Refresh

Figure 6:
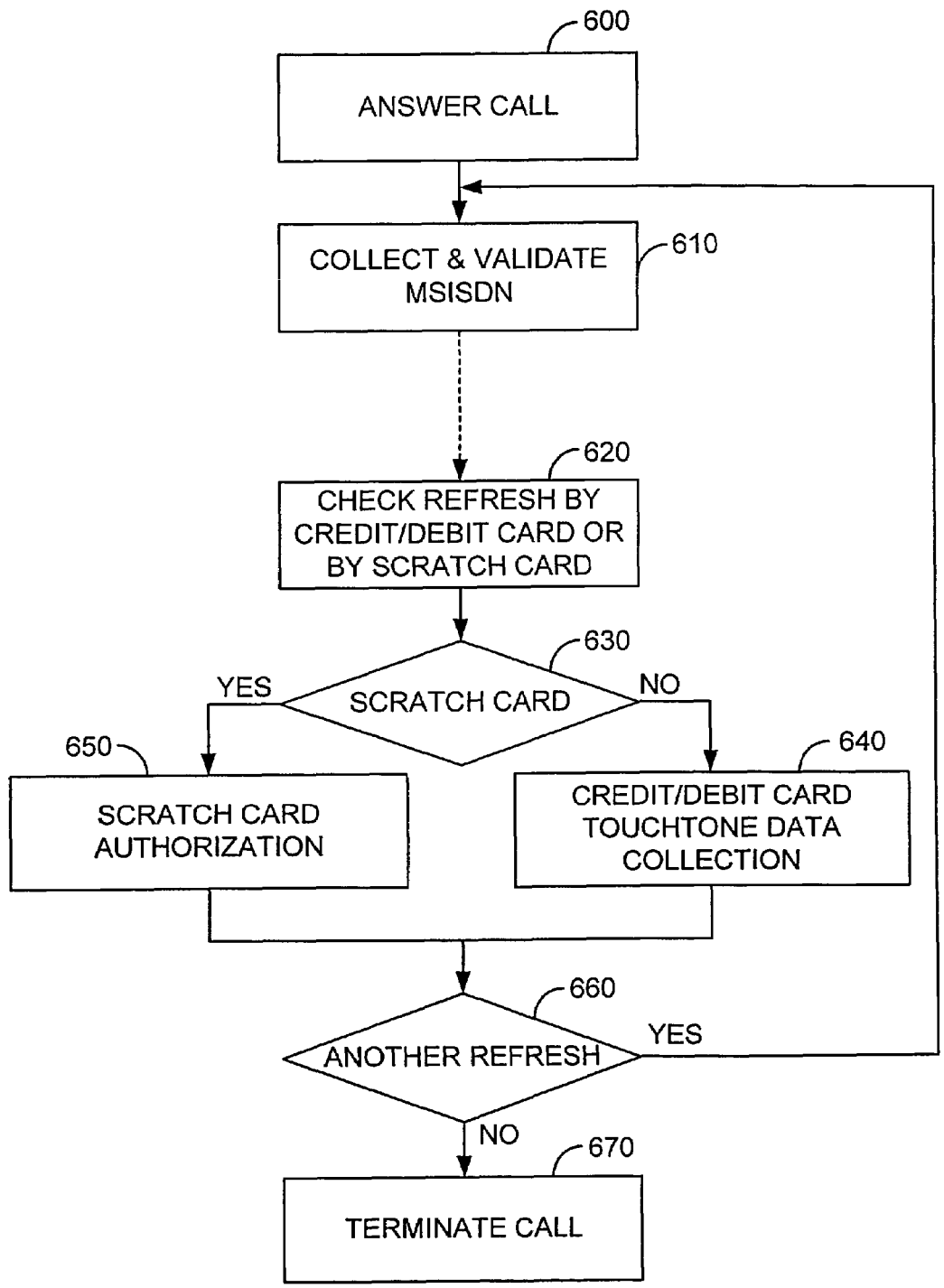
FIG. 6 shows a flow chart illustrating a process for refreshing an available credit amount.

FIG. 6 provides a flow chart that illustrates the credit refresh process (i.e., increasing the available credit amount). The subscriber accesses the IVR 30 by calling the preprogrammed number using the wireless device 10, the telephone 150 or via a data network such as the Internet. The system permits the subscriber to call the preprogrammed number, even though the available credit amount on the device 10 may have fallen below a required amount needed to make an outbound call.

When the preprogrammed number is called, the IVR 30 answers the call (step 600) and launches its application, similar to one used for the activation of the device 10. The IVR 30 collects and validates information about the device 10 (i.e., the MSISDN) (step 610). To increase the available credit amount, the subscriber may use (step 620) a credit/debit card and/or a scratch card (described in more detail below). In a single phone call, the subscriber may increase the available credit amount (step 660) for more than one device 10 and may use more than one credit/debit card, scratch card, or any combination of the above cards.

Once the scratch card has been authorized (step 650), or the credit/debit card information collected (step 640), and if the subscriber has no further operations to perform, the call will be terminated (step 670).

Figure 7:
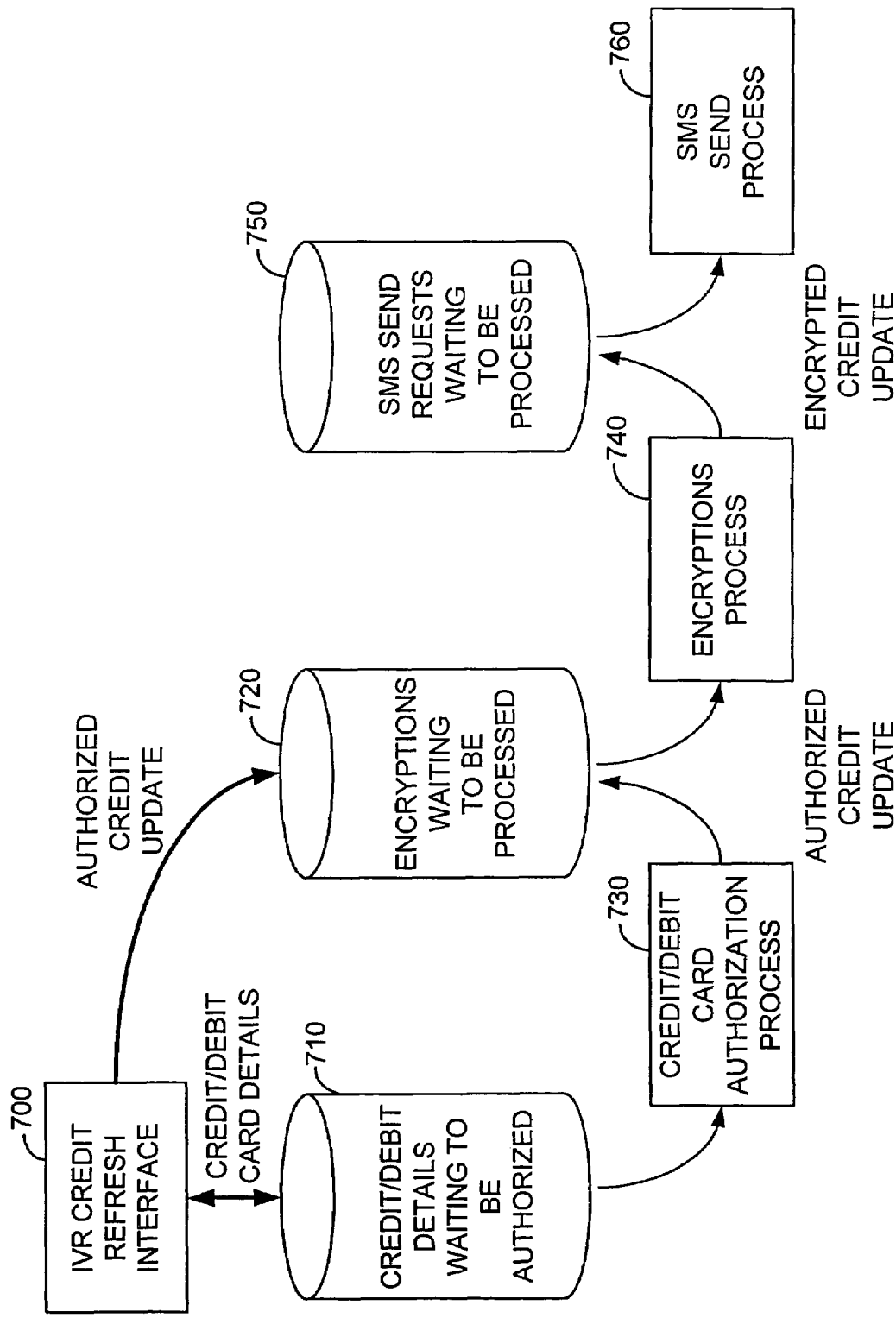
FIG. 7 shows a process flow relating to a credit refresh operations using an Interactive Voice Response System.

FIG. 7 illustrates a process flow relating to the credit refresh. The IVR 30 may queue the requests for background processing. As the scratch card has been authorized on line during the call the requests may be queued for processing by the EAS 40. (See blocks 700, 720). The credit/debit card information must first be authorized through the Payment Clearing Service (PCS) 200 (block 700 to block 710, to block 730 to block 720).

An encryption process can interface with the EAS 40 using, e.g., the TCP/IP socket socket protocol. The process will send the MSISDN and Credit Update Value pair (block 720) to the EAS 40. The EAS 40 returns the encrypted SMS message (block 740) to be sent to the device 10. It may also return other SMS messages that have been stored (e.g., requests to change the calling tariff tables, requests to check the available credit amount). The EAS 40 normally sends information back to the IVR 30 at the time of the credit refresh, but information can be sent on an ad hoc basis. All processed EAS requests are placed in a queue awaiting (block 750) to be sent by the SMS message to the device 10. Detailed records for each process are recorded for future audit.

The SMS send process handles the delivery of the SMS messages to their intended destination (block 760). As described above in FIG. 3, the device 10 generates a return SMS MO message in response to the SMS MT messages. The SMS process monitors bi directional SMS messages and only mark a message as processed once a successful return SMS MO message has been received. More particularly, the SMS process handles the delivery of the SMS messages via the SMSC 180 to their intended destination. The SMSC 180 returns a low level ack, then the device 10 returns an ack. The device 10 then returns a higher level ack for credit refresh, when the credit refresh has taken place in the device 10. This SMSMO may not be subjected to change. If no SMS MO message is received within a predetermined timeout, the SMSC 180 returns the SMS message to the IVR 30. Depending on the failure code in the message, the IVR 30 can choose to re transmit the credit refresh SMS message.

Credit/Debit Card Authorization

Specifics as to implementations for the credit/debit card are described below. Due to the possible delay in authorization of the credit/debit card transaction, this process may be performed after the IVR 30 interaction with the subscriber has terminated (step 670). Before the call termination, the subscriber is advised that the available credit amount will be updated; thus, the device 10 should be kept switched on. If the device 10 is turned off, the available credit amount will be updated as soon as the subscriber turns on the device 10.

The payment by the credit/debit card requires that the subscriber enter certain information about the credit/debit card. This information includes a card number, an expiration date, an issue number (only for certain types of the debit card), and a desired amount. This information is stored in the credit/debit card queue for transaction authorization (block 710). The process to be performed for the credit/debit card authorization consists of assembling the relevant card information collected from the subscriber in accordance with that required for the input drive on the PCS 200, and then sending this data to an acquirer (e.g., an institution that provided the credit/debit card) (block 730).

Payment clearing processing uses the PCS 200 and involves, e.g., the following elements: the subscriber, a card issuer, a merchant and the merchant's transaction acquirer (the acquirer). In one exemplary embodiment, on line requests for payment authorization are submitted by the merchant to the acquirer using protocols defined by the U.K. Association for Payment Clearing Services (APACS) Standards. The acquirer forwards the request to the issuer and returns the response to the merchant. Daily batches of authorized transactions are submitted to the acquirer in a format defined by, e.g., APACS 29 standard. The subscriber presents the credit/debit card information via the IVR 30 operated on the merchant's behalf. The card details are forwarded to the PCS 200, operated on merchant's behalf.

The PCS 200 handles the APACS 30 interaction with the acquirer, and returns an authorization response message. The authorization response message is generated by the credit/debit card processing system and can be, e.g., one of the following outcomes: authorized, declined or referred. To the subscriber, decline and referred messages effectively have the same meaning because the available credit amount will not be increased. If the transaction is declined or referred, the subscriber is informed to contact the card issuer. If the transaction is authorized, the details of the MSISDN and the available credit amount are passed to the EAS 40 queue for further processing (block 740). Once the credit/debit card authorization is performed on line, and authorized by the PCS 200, the IVR 30 passes this information to the CSS 50 for complete audit tracking within the CSS 50. In particular, the subscriber database 230 maintains, as described above, complete subscriber history of such transaction.

Scratch Card Activation

The service provider generates, prints and distributes the scratch cards to retailers. The scratch cards are packed in a package. The retailer sells the scratch card to the subscriber. While in a distribution chain the scratch cards cannot be used on the system 1 until they are activated. To activate the scratch card, the retailer has to contact the service provider. Upon providing necessary information (e.g., retailer's identification number, retailer's security code, and an identification number of the package), the service provider activates the scratch card.

The CSS 50 maintains detailed record about each scratch card in the scratch card database 240 (described above). In addition, the CSS 50 tracks all scratch cards usage to ensure that the scratch card cannot be used more than once. When the subscriber calls to increase the available credit amount, the CSS 50 confirms validity of the scratch card and no further authorization is required. In addition, the IVR 30 collects the scratch cards' records directly from the device 10, and passes these records to the CSS 50 for a validation matching.

Once the scratch card is validated the IVR 30 terminates the call with the subscriber, then passes the MSISDN and credit update value to the DAS queue for further processing (block 720). The CSS 50 marks the scratch card as 'used' in the scratch card database 240, and then updates the subscriber database 230 to maintain the complete subscriber history.

Device Barring/Disconnection

The device 10 may be barred or completely disconnected. These operations may be done automatically by the IVR 30 or manually by the agents. When the agents access the IVR 30 support function, they can launch a background task within the IVR 30 that requests the CSS 50 to put an incoming call bar on the particular MSISDN. The CSS 50 interfaces with the NBAS 190 to issue the bar commands, thus preventing incoming SMS messages and telephony calls to and from the device 10.

Agents of the Call Center 165

The system 1 according to the present invention may function automatically using the IVR 30 (as described above) or manually with help of the service provider's agents (agents). The agents are positioned in the Call Center 165 and have a telephony interface 160 and/or a workstation interface 170. The agents supplement the IVR 30 by performing similar processes. For instance, the agents may activate the device 10, increase the available credit amount, using the credit/debit card and/or the scratch card, and respond to general inquiries of the subscriber.

As in the case of the IVR 30, the agents may transfer funds using the scratch and/or credit/debit cards. There is a potential for abuses by the agents within the Call Center 165 because the agents are trusted personnel who require access to the processes in order to perform the necessary functions. Audit trails within the processes recognize this potential, and ensure that interfaces to these processes are secure and audited. Different levels of access will be required, as well as a personal identification number (PIN) protection for the agents.

The work queue model (described below) can also be used in case of the agents. The processes of the work queue model are the same as those within the IVR 30. The work queue model restricts the view of the tasks that perform the subprocesses to the agents' own input work queue, and the agents' own output work queue. The task performing the sub process has no knowledge of the sub processes that occur before itself. This therefore implies that different sub processes, running on different platforms, could all precede the task, provided that they have access fn, and share a common structure for placing data in the input work queue for the task.

Figure 8:
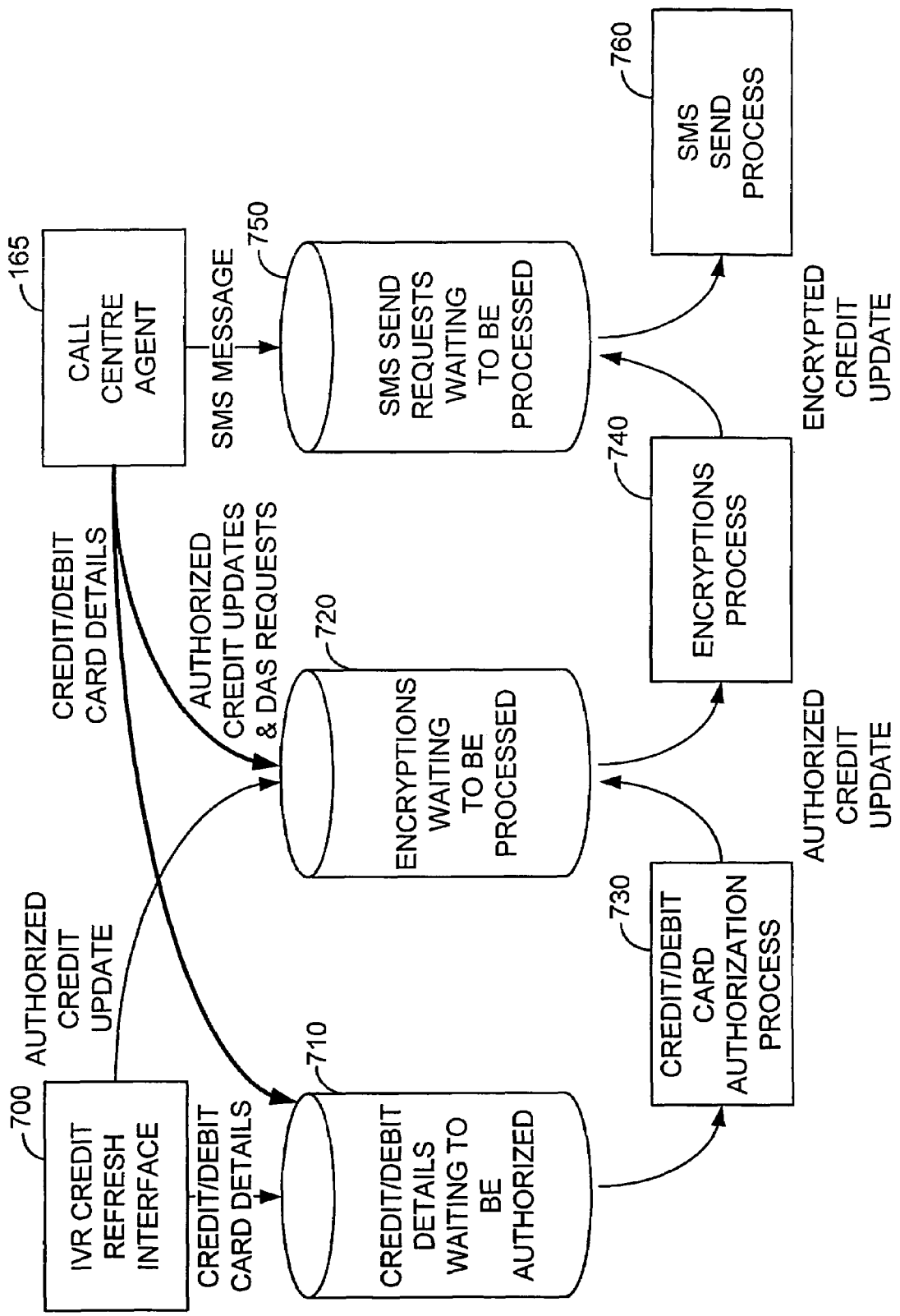
FIG. 8 shows another process flow relating to credit refresh operations using customer service agents.

FIG. 8 illustrates a process flow relating to the credit refresh operations that is similar to the one depicted in FIG. 7, except that the agents of the Call Center 165 are being used instead of the IVR 30 to control the process. The agents place a work data into one or more queues (blocks 710, 720 and 750). This ensures integrity of the processes, being defined in only one place. In addition, it is necessary to use a queue management system that has a mufti user capability, as there may be multiple agent tasks writing to the input queues, as well as multiple occurrences of the subprocess task reading the input work queue and writing to the output work queue.

The most suited system for implementing the queues using database tables, with full file and record locking mechanisms would be a relational database, such as from Oracle Corporation or Sybase. The IVR 30 can read and write from these databases, and the agents' application would be written using, e.g., a conventual programming language, that also has read and write capabilities to these databases. All activities performed by the agents will be subject to stringent auditing. Every transaction processed through the work queues will be stamped with date/time and agent's logon identification 10 that placed the entry in the work queue, including the IVR 30 ports.

Figure 9:
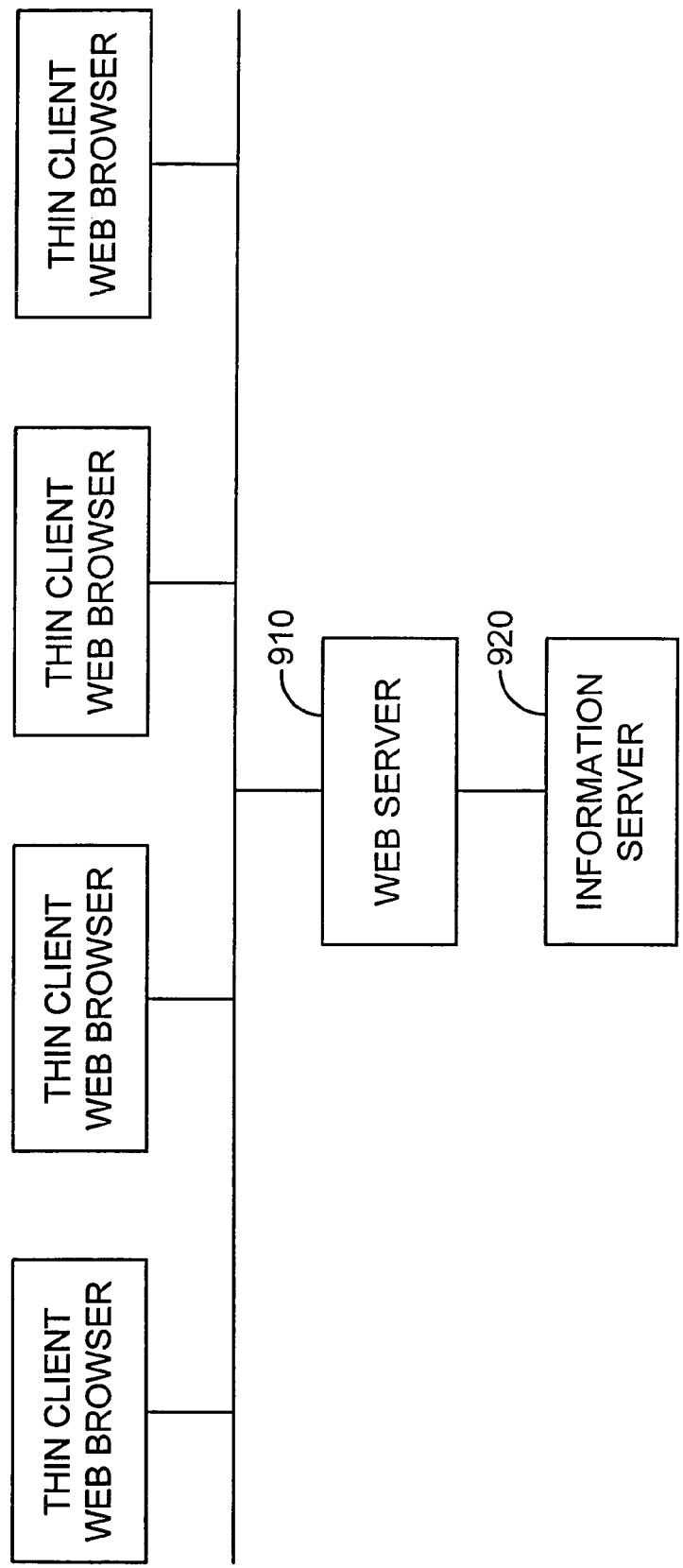
FIG. 9 shows agents' application developed as a thin client.

The agents' application may be developed as a thin client 900 shown in FIG. 9. The thin client 900 is the application deployment method that is generally considered the fastest to develop. The thin client 900 typically uses a web server 910 to connect to an information server 920. The application server 920 processes requests on behalf of the thin client 900 by accessing other information servers, and passes the responses back to the thin client 900. An interface for the thin client 900 can be developed using, e.g., Hyper Text Markup Language (HTML) or any other conventional programming languages. For the agents' application, the information server 920 already exists in the IVR 30.

Figure 10:
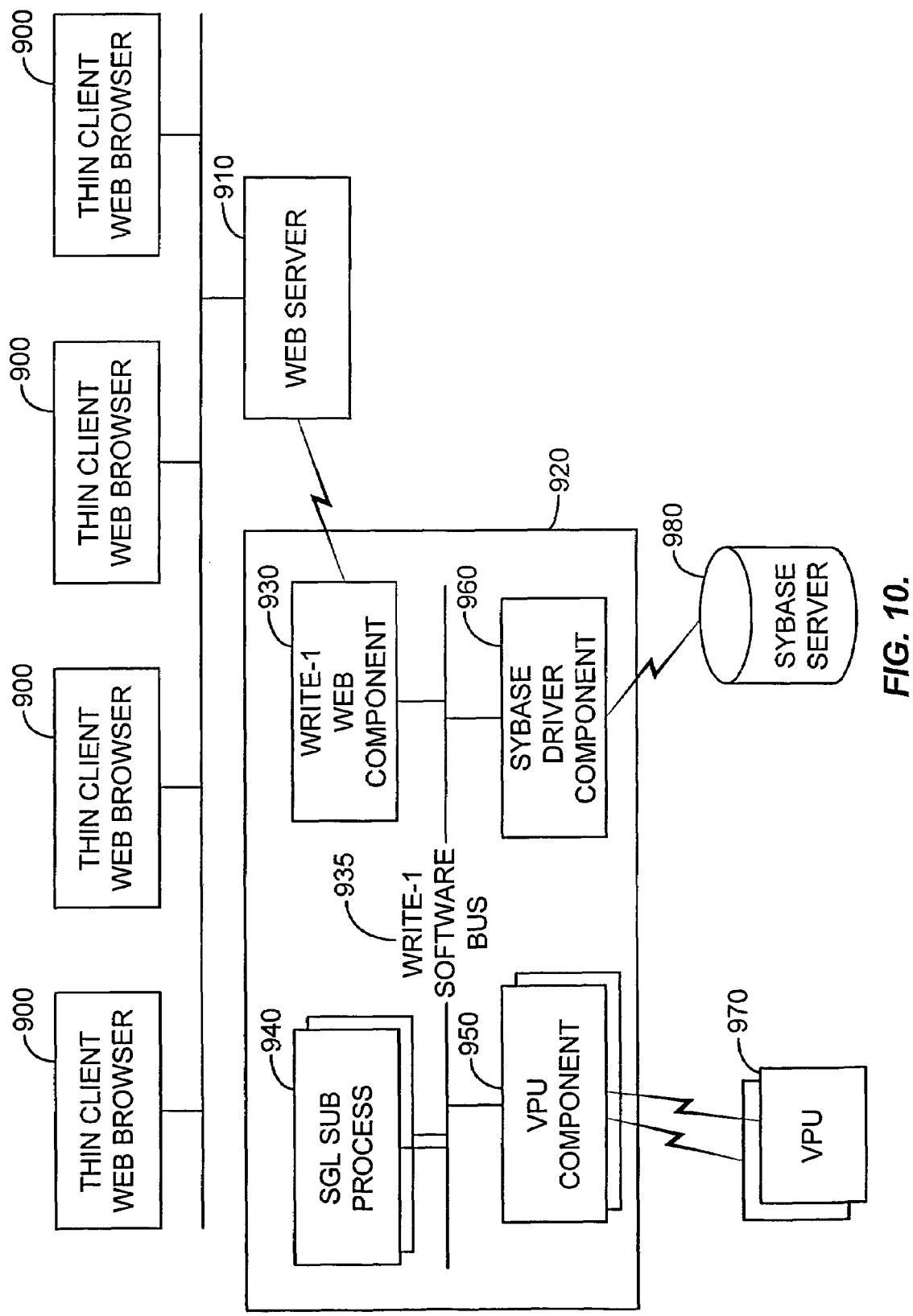
FIG. 10 shows a modification of FIG. 9.

Brite Voice's Write 1 software environment with which the IVR 30 may be developed, has an extension that supports the web server 910. This is illustrated in FIG. 10. The Write 1 software architecture model of a software bus 935 allows the web server 910 to use the software bus 935 to communicate with other components on the software bus 935. It permits the web server 910 to execute the same IVR 30 sub processes, access the same information, and allow the centralized management of the 'work queues'.

The agent workstations can use a conventional web browser, e.g., Netscape® Version 4 from Netscape Corporation. Development may be written using, e.g., HTML and Write 1 Scenario Generation Language (SGL), accessing a database server 980. Requests from the web browser will be directed by the web server 910 to the web component 930 on the software bus 935, these in turn will run SGL subprocesses 940, which will in turn read from and write to the database 960.

The above described system provides an arrangement that facilitates control of prepaid wireless devices. The arrangement simplifies the process by which a subscriber's equipment can have its credit refreshed and have the rate schedule under which it operates updated.

Several exemplary embodiments of the present invention are specifically illustrated and/or described herein. However, it will be appreciated that modifications and variations of the present invention are covered by the above teachings and within the purview of the appended claims without departing from the spirit and intended scope of the present invention.

What is claimed is:

1. A system for managing a wireless service, comprising:
a wireless device having both an internally stored credit amount and a preprogrammed number to communicate with an automated interactive response system operated by a wireless service provider;
a wireless service provider server on which said automated interactive response system resides;
wherein a user of said wireless device can use said internally stored preprogrammed number in a wireless device communication to request an increase in credit amount from said automated interactive response system; and,
wherein said automated interactive response server can automatically send a data bearer communication service message to said wireless device which is used by said wireless device to increase said credit amount.

2. The system for managing a wireless service of claim 1, wherein said data bearer communication service is a short message service (SMS).

3. The system for managing a wireless service of claim 1, wherein said interactive response system is an interactive voice response (IVR) system.

4. The system for managing a wireless service of claim 1, wherein said credit amount is prepaid.

5. The system for managing a wireless service of claim 1, wherein said data bearer communication service message is encrypted.

6. A system for managing a wireless service, comprising:
a wireless device having both an internally stored credit amount and a preprogrammed number to communicate with an automated interactive response system operated by a wireless service provider;
a wireless service provider server on which said automated interactive response system resides;
wherein a user of said wireless device can use said internally stored preprogrammed number in a wireless device communication to unbar said wireless device and request an increase to the internally stored credit amount from said automated interactive response system; and,
wherein said automated interactive response system can automatically remove a bar to the wireless device's receipt of data bearer communication service messages and send a data bearer communication service message to said wireless device which is used by said wireless device to increase the internally stored credit amount.

7. The system for managing a wireless service of claim 6, wherein said data bearer communication service is a short message service (SMS).

8. The system for managing a wireless service of claim 6, wherein said interactive response system is an interactive voice response (IVR) system.

9. The system for managing a wireless service of claim 6, wherein said data bearer communication service message is encrypted.

10. The system for managing a wireless service of claim 6, wherein said data bearer communication service message can also be used for said server to download a tariff table into a memory of said wireless device.

11. A system for managing a wireless service, comprising:
a wireless device having both an internally stored credit amount and a preprogrammed number to communicate with an automated interactive response system operated by a wireless service provider;
a wireless service provider server on which said automated interactive response system resides;
wherein a user of said wireless device can use said internally stored preprogrammed number in a wireless device communication to unbar said wireless device and request an increase to the internally stored credit amount from said automated interactive response system; and,
wherein said automated interactive response system can automatically remove a bar to the wireless device's receipt of data bearer communication service messages, obtain authorization for the requested credit amount increase and send a data bearer communication service message to said wireless device which is used by said wireless device to increase the internally stored credit amount.

12. The system for managing a wireless service of claim 11, wherein said data bearer communication service is a short message service (SMS).

13. The system for managing a wireless service of claim 11, wherein said interactive response system is an interactive voice response (IVR) system.

14. The system for managing a wireless service of claim 11, wherein said data bearer communication service message is encrypted.

15. The system for managing a wireless service of claim 11, wherein said data bearer communication service message can also be used for said server to download a tariff table into a memory of said wireless device.

* * * * *